United States Patent
Fischer

(10) Patent No.: US 6,854,381 B2
(45) Date of Patent: Feb. 15, 2005

(54) STEAM DOCKING UNIT OF AN ESPRESSO MACHINE

(75) Inventor: Daniel Fischer, Romanshorn (CH)

(73) Assignee: Eugster/Frismag AG, Romanshorn (CH)

( * ) Notice: Subject to any disclaimer, the term of this patent is extended or adjusted under 35 U.S.C. 154(b) by 0 days.

(21) Appl. No.: 10/874,478

(22) Filed: Jun. 23, 2004

(65) Prior Publication Data

US 2004/0255789 A1 Dec. 23, 2004

(30) Foreign Application Priority Data

Jun. 23, 2003 (DE) .................................. 203 09 691 U

(51) Int. Cl.[7] .............................. A23L 1/00; A47J 31/44
(52) U.S. Cl. ........................ 99/453; 99/293; 99/323.1; 99/323.3; 99/452
(58) Field of Search ..................... 99/452–455, 323.1, 99/323.3, 293, 294, 275, 467, 279, 468, 516, 483; 261/DIG. 10, DIG. 16, DIG. 76; 426/510, 511, 523

(56) References Cited

U.S. PATENT DOCUMENTS

| | | | | |
|---|---|---|---|---|
| 4,949,631 A | * | 8/1990 | Fregnan ........................ 99/452 |
| 5,052,289 A | * | 10/1991 | Di Girolamo ................ 99/452 |
| 5,154,110 A | * | 10/1992 | Chang .......................... 99/281 |
| 5,207,148 A | * | 5/1993 | Anderson et al. ............. 99/453 |
| 5,274,736 A | * | 12/1993 | Rohr, Jr. ...................... 392/447 |
| 5,551,331 A | * | 9/1996 | Pfeifer et al. ................. 99/280 |
| 6,345,570 B1 | * | 2/2002 | Santi ............................ 99/453 |
| 6,405,637 B1 | * | 6/2002 | Cai .............................. 99/293 |
| 6,561,079 B1 | * | 5/2003 | Muller et al. ................. 99/282 |
| 6,626,086 B2 | * | 9/2003 | Eugster ..................... 99/323.1 |
| 6,681,685 B2 | * | 1/2004 | Mahlich ...................... 99/453 |
| 6,711,987 B2 | * | 3/2004 | Yoakim et al. ............... 99/293 |
| 6,711,988 B1 | * | 3/2004 | Eugster ....................... 99/299 |
| 2003/0051603 A1 | | 3/2003 | Yoakim et al. |

\* cited by examiner

*Primary Examiner*—Timothy F. Simone
(74) *Attorney, Agent, or Firm*—Koda & Androlia

(57) ABSTRACT

An espresso machine steam docking unit which can be connected to a milk steaming pitcher (1). The steam unit includes a steam inlet (10), a steam outlet (7) which can be pressed, by means of an activation lever (19) that can be swung out of a rest position into an operating position, against a steam inlet opening (2) of a milk steaming pitcher (1), a valve (12) which is connected to the steam inlet (10) and the steam outlet (7) and which can be activated by the activation lever (19). In addition, a switching contact (21), which is activated by the activation lever (19) to activate a steam generator in the espresso machine when the activation lever is in operating position, is provided. In addition, a steam release line (18) is provided and is connected by means of the activation lever (19) through the valve (12) to the steam inlet (10) and the steam outlet (7).

8 Claims, 3 Drawing Sheets

STEAM DOCKING UNIT OF AN ESPRESSO MACHINE

BACKGROUND OF THE INVENTION

1. Field of the Invention

The present invention relates to a steam docking unit of an espresso machine.

2. Prior Art

Steam docking units are conventionally a supplemental component of coffee machines, especially espresso machines; and they are connected to a milk steaming pitcher so that it can conduct the steam and are sealed off from the surroundings. The milk steaming pitcher contains all mechanical elements required for producing milk foam and also the milk. The necessary steam is fed to the milk steaming pitcher through the steam docking unit.

The use of such a milk steaming pitcher has an advantage, among others, that during steaming no steam or steamed milk, which might spray, is released into the surroundings, especially when, instead of a closed milk steaming pitcher, an open vessel is used in which a steam tube is not sufficiently submerged into the foaming liquid or if the milk steaming pitcher does not contain enough liquid.

A steam docking unit, which is intended to steam a liquid such as milk in a closed container using steam that is produced in a coffee machine of the espresso style, is disclosed in, for instance, WO 01/26520 that corresponds to U.S. Publication No. 2003-0051603 A1.

This steam docking unit should be easy to use and maintain and should avoid undesired spraying of liquid during steam treatment. To accomplish this, a known steam docking unit is provided with a steam inlet which can be connected, through a valve comprising a cylindrical slide in a cylindrical body, to a steam outlet which is put into contact with a steam inlet opening of a steam pitcher and is automatically sealed off from the surroundings when this is done by a ring-shaped seal. The valve with its cylindrical body can be raised and lowered by a control lever which is mounted so that it can pivot. Inserting the steaming pitcher into its steam receiving position on the espresso machine forces the control lever into its activation position. When the steaming pitcher is removed, the valve with the cylindrical slide swings upward, thereby closing the valve, which then stops the delivery of steam to the steam outlet. The control lever has an arm with which it operates a switching contact to activate the production of steam in the coffee machine in its operating position when it is lying against the milk steaming pitcher, or to turn it off when the control lever is free of the milk steaming pitcher.

Though this steam docking unit is supposed to stop the delivery of steam when the control lever is in its rest position, undesired release and discharge of residual steam in the immediate area of the steam docking unit can occur when the milk steaming pitcher is removed from the steam docking unit, especially if the connecting steam outlet line downstream of the valve is of a relative large volume.

SUMMARY OF THE INVENTION

The present invention is based on the task of avoiding the release and discharge of residual steam from the immediate surroundings of the steam outlet and the steam inlet opening of the steam pitcher, which is undesirable for the operator, when the milk steaming pitcher is removed from the steam docking unit and thus the steam docking unit is disconnected from the milk steaming pitcher. If possible, this safety function should not impede the handling of milk steaming pitchers for steaming, and should have as uncomplicated a construction as possible.

The above object is accomplished by a unique structure for a steam docking unit of the present invention. Though the present invention concerns especially milk steaming pitchers, it is also possible to use other vessels for steaming liquid foodstuffs which they contain.

The essential characteristic of the present invention is that residual steam is let out through a steam release line from the immediate area of the steam outlet of the steam docking unit to a place which is not dangerous to the operator, in particular a place where a receiving bowl is installed.

This is accomplished by a valve which releases or discharges the residual steam from the outlet volume of the steam docking unit, and a controll of this valve and a switching contact for the steam generator, which automatically ensures that the steam production is turned off before the steam release line is connected to the steam outlet through the valve and that this is done before the milk steaming pitcher is removed from the steam docking unit and thus the steam conducting connection between the steam docking unit and the steam inlet opening of the milk steaming pitcher is open. On the other hand, the controll should ensure that when an activation lever which performs the control is in its operating position, the steam release line is closed by the valve before the steam generator is activated, and the steam is conducted from the steam outlet of the steam docking unit into the milk steaming pitcher, the way it is supposed to be.

Especially advantageous features of the realization of this principle of targeted steam release and residual steam exhaust are also provided by the present invention.

When the activation lever is in its rest position, the valve connects the steam release line not only to the steam outlet, but also to the steam inlet, which in this state does not have steam applied to it by the steam generator, so that residual steam is also discharged from the steam inlet into the steam release line. Thus, a valve which interrupts the flow from the steam inlet to the steam outlet is unnecessary. It is assured that the steam outlet is not separated from the milk steaming pitcher under operating steam pressure; otherwise there would be an operator-endangering release of steam in the immediate area of the steam outlet.

The especially advantageous design of the present invention involves making the steam outlet tube a component of a steam supply cylinder which can be lowered and raised in a cylinder sleeve; the steam supply cylinder can be lowered by means of the activation lever against the force of a return spring into its steam supply position, in which it can be locked with a locking/unlocking device that van be unlocked with the activation lever to allow the steam supply cylinder to rise automatically under the force of the return spring into its rest position after the activation lever activates the switching contact, which thus turns off steam generation, and after the activation lever opens the valve to the steam release line.

The above structure, which comprises few movable parts, makes it possible for the outlet section of the steam outlet tube to be pushed in a straight-line movement into the steam inlet opening of the milk steaming pitcher, to produce an especially reliable connection of the steam outlet, not merely a surface-mounted connection. Essentially, the only things that are pivoted instead of moved with a linear movement are the activation lever, and preferably the valve is a rotatable ceramic valve whose rotational axis is provided coaxially with the pivoting axis.

The locking/unlocking device that is especially expedient in connection with the steam supply cylinder, which can be lowered and raised in the cylinder sleeve, is characterized by a locking pin that is in a locking pin receiving hole in the steam supply cylinder under pressure of a locking pin spring, which can slide it into a locking pin catch in the cylinder sleeve, and by a locking lever which is mounted on the cylinder sleeve and engages in the locking pin catch and which can be pivoted by means of the activation lever to press the locking pin out of the locking pin catch.

The above structure achieves an especially reliable adjustment of the operating position and rest position of the activation lever, without having it to lie against the milk steaming pitcher in its operating position; otherwise, deviations in the position where the milk steaming pitcher is set up, if it is negligently handled, and deviations in the design shape of the milk steaming pitcher could disturb exact activation of the activation lever. Instead, the activation lever can simply be swung into its operating position manually. Accordingly, when the steam supply cylinder with the steam outlet is moved along with it and reaches its steam supply position, it will automatically be held in this position by the locking/unlocking device. Not until the activation lever is returned to its rest position does it unlock the locking/unlocking device, and this is inevitably in the correct return phase, during which the locking pin is pressed out of the locking pin catch. The steam supply cylinder is moved back into rest position under the action of the return spring.

The activation lever is connected to the steam supply cylinder in a non-positive manner to lower it into its steam supply position but not to return it into rest position, in order to turn off the steam generator by the switching contact and to connect the steam inlet and the steam outlet to the steam release line through the valve, while keeping the position of the steam supply cylinder unchanged at first. In order to accomplish this, the locking/lever is provided with an inclined lifting surface, which a driving bolt of the activation lever run up against, when the activation lever is swung along the unlocking lever, and one side of the activation lever lies against a driving block of the steam supply cylinder.

Moreover, in order to perform the above-described functions of tuning the steam generator on and off, an activation element of the switching contact is provided in a path of travel of the activation lever.

To seal off the outlet end of the steam outlet tube securely from the surroundings in operating position, the steam outlet tube is surrounded by a sealing sleeve, which presses around the steam inlet opening of the milk steaming pitcher when the steam supply cylinder is lowered. Inserting a piece of the outlet end into the milk steaming pitcher pushes the sealing sleeve back and together, in order to achieve reliable sealing action even given dimensional tolerances of the steam docking unit and the milk steaming pitcher.

DETAILED DESCRIPTION OF THE INVENTION

A milk steaming pitcher 1, only the top part of which is shown, comprises a steam inlet opening 2 in the form of a hole which leads to a suction chamber 3 to steam the milk. To accomplish this, a suction chamber is connected to a milk line 4 leading into the vicinity of the floor of the milk steaming pitcher. A foamy milk/steam mixture formed in the suction chamber with a supply of air is carried away down through a chamber-shaped enlargement 5, which reduces the flow speed.

In order to supply a milk steaming pitcher 1 with steam, an espresso machine (not shown) is used with a steam generator, which is connected to a steam docking unit that can be one of the components of the espresso machine.

Figure 1:
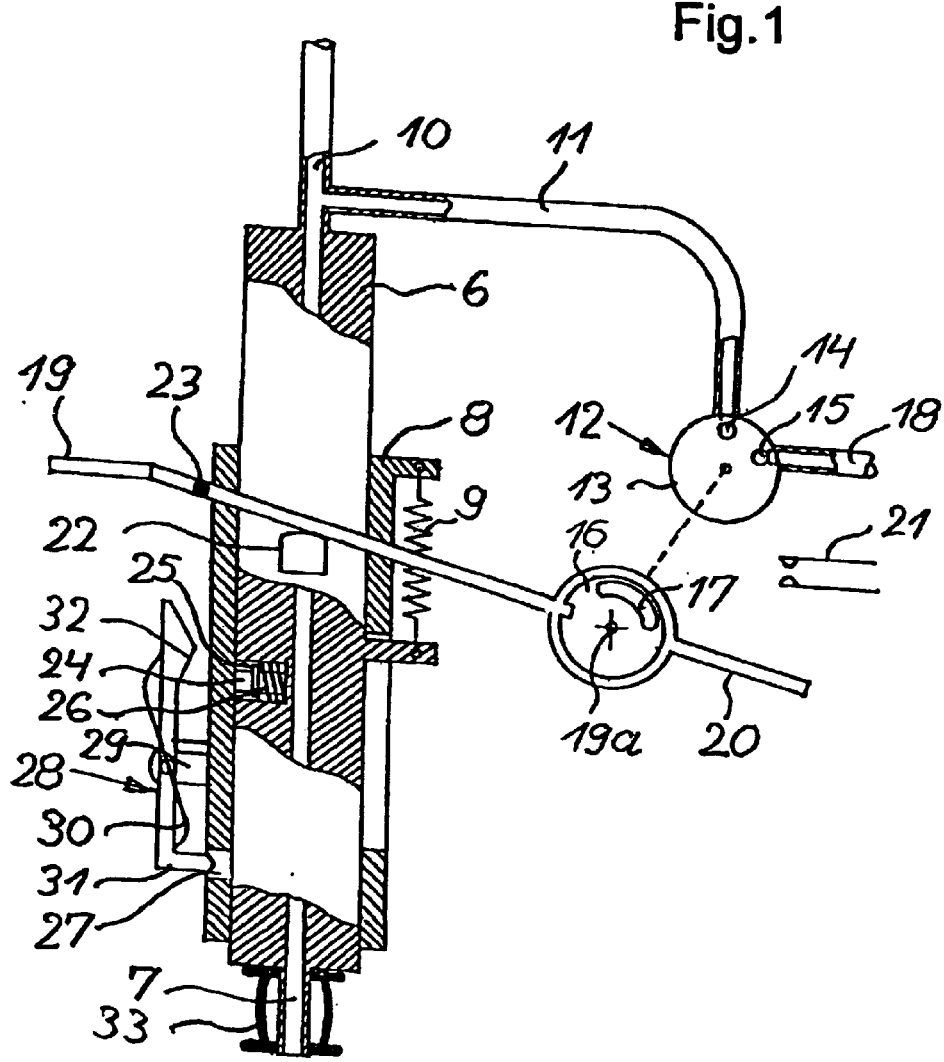
FIG. 1 shows in longitudinal cross section the steam docking unit of the present invention in rest position with the broken off top part of a milk steaming pitcher.
Figure 1:
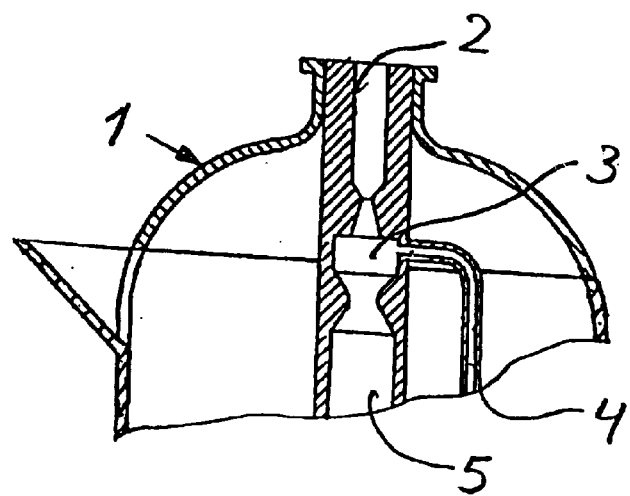

The steam docking unit comprises a steam supply cylinder 6 with a steam outlet tube extending in its longitudinal direction, whose lower section forming a steam outlet 7. The steam supply cylinder 6 is slidable in a cylinder sleeve 8 and is normally held by a return spring 9 in a raised rest position that is shown in FIG. 1.

The lower section of the steam outlet tube 7 is a steam outlet. So as to connect the steam outlet, in a steam sealed manner, to the steam inlet opening 2 of the milk steaming pitcher, the steam outlet is surrounded by an axially flexible sealing sleeve 33, which comes to lie around the steam inlet opening 2 of the milk steaming pitcher 1 when the steam supply cylinder 6 is lowered (see FIG. 2).

Figure 2:
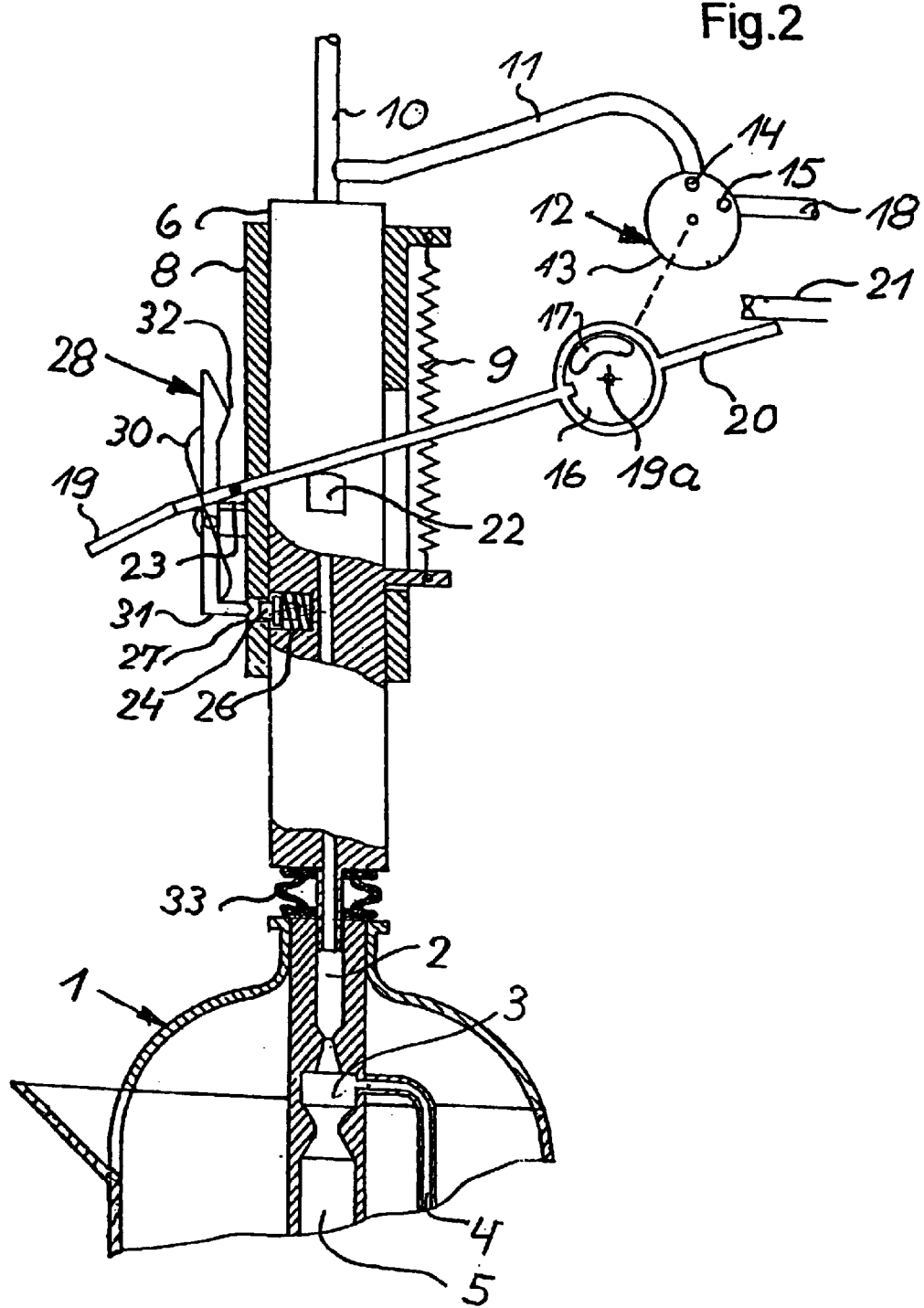
FIG. 2 shows in longitudinal cross section the steam docking unit of FIG. 1 in operating position, that is steam supply position, in which the steam docking unit is connected to the milk steaming pitcher so that steam can be conducted.

In the steam supply position of the steam supply cylinder 8 shown in FIG. 2, the lower section of the steam outlet tube, which is the steam outlet 7, projects into the steam inlet opening 2 of the milk steaming pitcher 1 as shown in FIG. 2.

Opposite the lower section of steam outlet tube 7, its upper end has a steam inlet 10 in the form of a flexible steam supply line 11. Branching off from steam supply line 10 is a steam exhaust 11, which is also flexible, and leads to a valve which is in the form of a rotatable ceramic valve that is generally marked with the reference numeral 12.

Figure 3A:
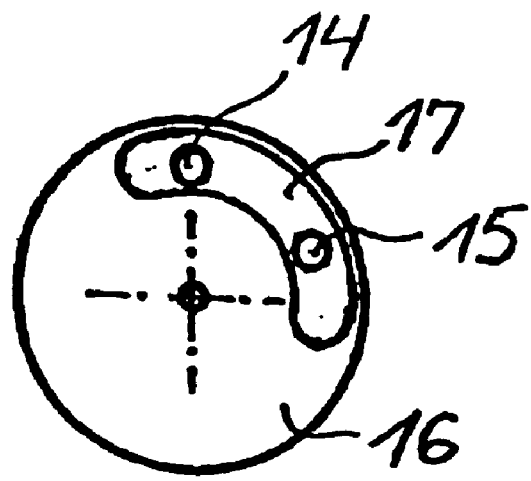
FIG. 3a shows a detail of the steam docking unit, namely a ceramic valve in rest position.

The ceramic valve 12 comprises a stationary ceramic valve disc 13 with a steam exhaust entrance hole 14 and a steam exhaust exit hole 15 formed therein. The stationary ceramic valve disk 13 cooperates with a rotatable ceramic valve disk 16, which has a connection channel 17. This connection channel 17 is provided and dimensioned in such a way that, depending on the rotational position of the rotatable ceramic valve disk 16, it can connect the steam exhaust entrance hole 14 with the steam exhaust exit hole 15 (see FIG. 3a), through which a connection is made between flexible steam exhaust 11 and a steam release line 18 at steam exhaust exit hole 15. The steam release line 18 leads to a catching bowl (not shown) outside of the operating area.

Figure 3B:
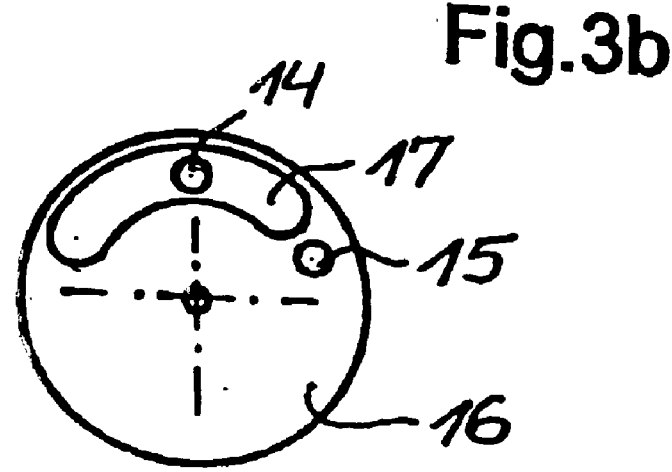
FIG. 3b shows the ceramic valve in operating position

By contrast, the rotational position of the rotatable ceramic valve disk 16 shown in FIG. 3b, which corresponds to the steam supply position of steam supply cylinder 6, does not make a connection between the connection channel 17 and the steam exhaust exit hole 15.

The ceramic valve 12 can be rotationally adjusted by an activation lever 19. For this purpose, the activation lever 19 is connected to the rotatable ceramic valve disk 16. The axis of rotation 19a of this ceramic valve disk 16, that is the axis of rotation of the ceramic valve 12, simultaneously forms the pivoting axis of the activation lever 19.

The activation lever arm 20 of the activation lever 19 activates a switching contact 21, which is connected, in a way not shown, to the espresso machine's steam generator, particularly to a steam pump. The activation lever arm 20 and switching contact 21 can have an activation element (not shown) provided between them, so that the switching contact 21 is activated through it.

The activation lever 19 lies against a driving block 22 of the steam supply cylinder 6. By pressing on this driving block 22, the activation lever 19 can press the steam supply cylinder 6 down out of the rest position shown in FIG. 1 into the steam supply position shown in FIG. 2.

The activation lever 19 has a driving bolt 23, which is a component of a locking/unlocking device of the steam supply cylinder 6 in the cylinder sleeve 8.

The locking part of the locking/unlocking device includes a locking pin 24, which is mounted so that it can slide transversely to the main axis of the steam supply cylinder 6, that is radially, in a locking pin receiving hole 25; and the locking pin 24 is under the pressure of a locking pin spring 26 which presses locking pin 24 radially outward toward the cylinder sleeve 8. The cylinder sleeve 8 has a locking pin catch 27 that is also radially oriented at a place where the locking pin 24 engages into the locking pin catch 27, when the steam supply cylinder 6 is in steam supply position (see FIG. 2).

The essential element of the unlocking part of the locking/unlocking device is a two-arm unlocking lever 28, which is mounted to the cylinder sleeve 8 on an unlocking lever support 29 so that it can pivot. The unlocking arm 28 is under the action of an unlocking lever return spring 30, so that a first arm—the lower portion in the drawings—which ends in a unlocking lever tip 31, is pressed away from cylinder sleeve 8, swinging the unlocking lever tip 31 away from the inside of the locking pin catch 27, so that when the steam supply cylinder is in steam supply position and the locking pin 24 is in the locking pin catch 27, the arm does not press against the locking pin 24 (see FIG. 2). The unlocking lever 28 has, on its opposite, a second lever arm—the upper portion in the drawing—an inclined lifting surface 32, which the driver bolt 23 can run up against when the activation arm 19 is swung upward out of the operating position shown in FIG. 2, in which the steam supply cylinder 6 is in a steam supply position, into its rest position; and in so doing, pressing the unlocking lever tip 31 against the locking pin 24 and moves the locking pin 24 against the force of the locking pin spring 26 out of the locking pin catch 27.

It should be noted that the rest position of the activation lever 19 corresponds to the rest position of the steam supply cylinder 6 (see FIG. 1); however, the steam supply position of the steam supply cylinder 6 can still be maintained when the activation lever 19 is swung out of its lower operating position, which is opposite rest position (see FIG. 2), in the direction toward the rest position. The lower position of the steam supply cylinder is marked as the steam supply position.

The above-described steam docking unit operates in the following manner:

In order to feed the necessary steam to the milk steaming pitcher 1 through the steam docking unit, the steam supply cylinder 6 with steam inlet 2, in the form of the flexible steam supply line and the flexible steam exhaust 11, is manually pushed by means of the activation lever 19, which lies against the driving block 22 of the steam supply cylinder 6, out of the rest position shown in FIG. 1 into the steam supply position inside the cylinder sleeve 8 shown in FIG. 2.

In this process, the activation lever 19 rotates about its pivoting axis and thus simultaneously rotates about the axis of rotation 19a of the coaxially mounted rotatable ceramic valve disk 16. This action rotates the ceramic valve disk 16 out of its open rest position shown in FIGS. 1 and 3a into a closed operating position shown in FIGS. 2 and 3b. In the rest position, the steam exhaust 11 is connected to the steam release line 18 through the steam exhaust hole 14 in the stationary ceramic valve disk 13, then through the connection channel 17 in the rotatable ceramic valve disk 16, and then through the steam exhaust exit hole 15 in the stationary ceramic valve disk 13.

By contrast, in the operating position shown in FIG. 2, the connection between the flexible steam exhaust 11 and the steam release line 18 inside the ceramic valve 12 is interrupted, since the connection channel 17 of the rotatable ceramic valve disk 16 no longer covers the team exhaust exit hole 15 of the stationary ceramic valve disk.

The steam contained in the system with the steam inlet 10 and steam outlet 7 is released through the steam release line 18 and diverted into a receiving bowl (not shown). While the activation lever 19 performs the movement necessary for this, the driving bolt 23 of the activation lever 19 slips under the inclined lifting surface 32 of the unlocking lever 28 without acting on the lock with locking pin 24.

Moreover, the lower section of the steam outlet tube, which forms the steam outlet 7, enters into the steam inlet opening 2 of the milk steaming pitcher 1, with the steam supply cylinder 6 being connected to the steaming pitcher 1 in a steam-tight manner by the sealing sleeve 33. Shortly before reaching this steam supply position of the steam supply cylinder 6, which is shown in FIG. 2, the activation lever arm 20 of the activation lever 19 closes the steam generator's switching contact 21. At the end of the movement of the activation lever 19, the locking pin 24, which is in the locking pin receiving hole 25 of the steam supply cylinder 6, is forced by the locking pin spring 26 to engage into the locking pin catch 24 of the cylinder sleeve 8 and fixes the steam supply cylinder 6 in its steam supply position shown in FIG. 2.

After the steaming process is completed, the activation lever 19 is directly pressed by hand out of its operating position shown in FIG. 2 in the direction of its rest position shown in FIG. 1, i.e., it is swung up.

When this is done, after the lever travels just a small distance the switching contact 21 of the steam generator, especially its steam pump, is opened, stopping steam generation. Simultaneously, the connection channel 17 of the rotatable ceramic valve disk 16— which in the operating position stands over the steam exhaust entrance hole 14 and shortly before the steam exhaust exit hole 15 of the stationary ceramic valve disk 13— covers the steam exhaust exit hole 15. Thus, the steam still in the system with the steam outlet 7 and the steam inlet 10 is released and flows through the route 11-14-17-15-18 into a receiving bowl.

Only after this release process does the driving bolt 23 of the activation lever 19 reach the inclined lifting surface 32 of the unlocking lever 28 and swing it, against the return force of its unlocking lever spring 30, out of its rest position about its pivot (not designated), until its unlocking lever tip 31 presses locking pin 24 out of locking pin catch 27. This releases steam supply cylinder 6, which is automatically slid back by the return spring 9 into its rest position shown in FIG. 1. Only once this return process occurs, the steam outlet 7, which is embodied by the lower section of steam outlet tube, is pulled out of the milk steaming pitcher 1.

The above procedure thus reliably and automatically prevents the lower section of the steam outlet tube, which forms the steam outlet 7, from being pulled out of milk steaming pitcher 1 under steam pressure, which would cause a release process that threatens the surroundings and that might even be dangerous.

The embodiment shows the elements of the steam docking unit lying essentially in one plane. However, for design reasons the elements can also be provided so that they are staggered about the vertical axis of the steam docking unit.

What is claimed is:

1. An espresso machine steam docking unit which is connected to a milk steaming pitcher (1) and which comprises: a steam inlet (10), a steam outlet (7) which can be pressed, by means of an activation lever (19) that is swung out of a rest position into an operating position, against a steam inlet opening (2) of a milk steaming pitcher (1), a valve (12) which is connected to the steam inlet (10) and steam outlet (7) and which is activated by the activation lever (19), and a switching contact (21) which is activated by the activation lever (19) and which activates a steam generator in an espresso machine when the activation lever (19) is in an operating position, wherein a steam release line (18) is further provided and is connected as a function of operating state through the valve (12) to the steam inlet (10) and steam outlet (7), and the valve (12) is controlled by means of the activation lever (19);

so that the valve (12) is closed when the activation lever (19) is moved out of its rest position into its operating position, before the switching contact (21) activates the steam generator, when the steam outlet (7) is connected to the steam inlet opening (28) of the milk steaming pitcher (1), and so that the valve (12) is opened, by moving the activation lever (19) out of its operating position into its rest position, after the switching contact (21) has turned off the steam generator, before the steam outlet (7) is separated from the steam inlet opening (28) of the milk steaming pitcher (1).

2. The steam docking unit according to claim 1 wherein the steam outlet (7) in a form of a steam outlet tube is a component of a steam supply cylinder (6) which is lowered and raised in a cylinder sleeve (8), the steam supply cylinder (6) is lowered against force of a return sprig (9) by means of the activation lever (19) into its operating position, in which the steam supply cylinder (6) is locked with a locking/locking device (23, 32), and the locking/unlocking device (23, 32) is unlocked with the activation lever to allow the steam supply cylinder (6) to rise automatically under the force of the return spring (9) into a rest position, after the activation lever (19) activates the switching contact (21), that thus turns off the steam generation, and after the activation lever (19) opens the valve (12) to the steam release line (18).

3. The steam docking unit according to claim 2, wherein the locking/unlocking device (23, 32) comprises:

a locking pin (24), which is provided in a locking pin receiving hole (25) in the steam supply cylinder (6) under pressure of a locking pin spring (26), which slides the locking pin (24) into a locking pin catch (27) formed in the cylinder sleeve (8), and an unlocking lever (28) which is mounted on the cylinder sleeve (8) and which engages into the locking pin catch (27) and which can be swung by means of the activation lever (19), pressing the locking pin (24) out of the locking pin catch (27).

4. The steam docking unit according to claim 3, wherein the unlocking lever (28) has an inclined lifting surface (32), which a driving bolt (23) of the activation lever (19) run up against, when the activation lever (19) is swung along the unlocking lever (28), and when the activation lever (19) is in operating position, the driving bolt (23) is located at a distance from the inclined lifting surface (32).

5. The steam docking unit according to claim 1 or 2, wherein the activation lever (19) lies against a driving block (22) provided on the steam supply cylinder (6).

6. The steam docking unit according to claim 1 or 2, wherein the valve (12) is a rotatable ceramic valve whose axis of rotation is coaxial with a pivoting axis (19a) of the activation lever (19).

7. The steam docking unit according to claim 1 or 2, wherein an activation element of the switching contact (21) is provided in a path of travel of the activation lever (19).

8. The steam docking unit according to claim 2, wherein an outlet end of the steam outlet tube is surrounding by a sealing sleeve (33) which is pressed together in a path-dependent manner against the milk steaming pitcher (1) around its steam inlet opening (2) when the steam supply cylinder (6) is lowered.

* * * * *